United States Patent [19]

Kitaura et al.

[11] Patent Number: 5,062,005
[45] Date of Patent: Oct. 29, 1991

[54] VIDEODISC REPRODUCING APPARATUS

[75] Inventors: Hiromu Kitaura, Osakasayama; Yoshio Hirauchi, Osaka, both of Japan

[73] Assignee: Matsushita Electric Industrial Co., Ltd., Osaka, Japan

[21] Appl. No.: 304,646

[22] Filed: Feb. 1, 1989

[51] Int. Cl.$^5$ .............................................. H04N 5/76
[52] U.S. Cl. .................... 358/342; 358/310; 358/320; 358/323; 358/335; 358/339; 358/158; 360/36.1; 360/36.2
[58] Field of Search ............... 358/310, 320, 321, 322, 358/323, 337, 338, 339, 342, 158; 369/47, 48, 49, 50; 360/36.2, 36.1

[56] References Cited

U.S. PATENT DOCUMENTS

| | | | |
|---|---|---|---|
| 4,488,170 | 7/1990 | Nillesen | 358/158 |
| 4,672,470 | 6/1987 | Morimoto et al. | 358/323 |
| 4,677,499 | 6/1987 | Shirota et al. | 358/339 |
| 4,733,311 | 7/1990 | Yoshinaka | 358/320 |

OTHER PUBLICATIONS

Toyama et al., *Optical Videodisc for High-Definition Television by the MUSE*, Jan. 1986, pp. 25–29, Dec. 1985.

Primary Examiner—Roy N. Envall, Jr.
Assistant Examiner—Thai Tran
Attorney, Agent, or Firm—Wenderoth, Lind & Ponack

[57] ABSTRACT

A videodisc reproducing apparatus includes a pilot carrier extraction circuit for extracting a pilot carrier from a videodisc reproduced signal and a clock generating circuit. The clock generating circuit includes an analog/digital converter and a phase-locked loop oscillator for generating a sampling clock signal for the analog/digital converter, whereby the videodisc reproduced signal is converted into digital form in synchronism with the pilot carrier. A phase-shift circuit is provided for phase shifting the sampling clock signal and for applying a thus phase-shifted sampling clock signal to the analog/digital converter. A phase detecting circuit is provided for detecting a digital sampling phase of a synchronizing signal included in a MUSE signal of the videodisc reproduced signal which has been converted into digital form according to positional information in the synchronizing signal of the videodisc reproduced signal detected by a synchronizing signal detection circuit. The phase detecting circuit further detects whether the detected digital sampling phase is advanced or retarded with respect to a digital sampling phase of a specified normal MUSE signal. An up/down counter is provided for generating an address signal output according to an output of the phase detecting circuit to control the phase-shift circuit.

1 Claim, 5 Drawing Sheets

NO. 1 Line

NO. 2 Line

VIDEODISC REPRODUCING APPARATUS

BACKGROUND OF THE INVENTION

This invention relates to a videodisc reproducing apparatus for reproducing videodiscs on which band-compressed signals of high-definition television called MUSE are recorded.

Now is proposed a method of band-compressed transmission called MUSE for transmitting video signals of HDTV capable of obtaining higher definition pictures as compared with the existing standard television system by using a channel of 27 MHz bandwidth of satellite broadcasting in Japan.

This transmission method is initially intended to realize satellite broadcasting in the same transmission channel as the existing broadcasting, by compressing the HDTV signals possessing a bandwidth of 20 MHz into a base band of 8 MHz by multiplex sub-Nyquist sampling, and then frequency-modulating to suppress the transmission band to a width of a 24 to 27 MHz corresponding to one channel of broadcasting satellite.

In this method, as stated above, the band is compressed to $\frac{1}{4}$ by 4:1 sub-sampling. This sampling pattern is shown in FIG. 1. In the diagram, the solid line 1 denotes scanning lines of 2 n fields (n is a positive integer), and the broken line 2 represents scanning lines of 2 n+1 fields. Numeral 3 indicates a sampling point of the 4 n-th field; numeral 4 is a sampling point of the 4 n+1-th field; numeral 5 is a sampling point of the 4 n+2-th field; numeral 6 is a sampling point of the 4 n+3-th field, and numeral 7 indicates a point not transmitted. The image sampled in this manner is compressed to $\frac{1}{4}$ of the original band, and is transmitted.

On the other hand, at the receiving side, there is a frame memory, and all sampling points of the portion of four fields being transmitted are utilized to reproduce the image, and furthermore at the point 7 in FIG. 1 that is not transmitted, the image is reproduced by two-dimensional interpolation. In this way, a still picture can be perfectly reproduced into the original image, but in the moving picture, since the correlation between fields is low, when the points of all four fields are used, the image may be blurred or the sampling pattern may be visible, and the picture is disturbed. Therefore, for reproduction of a moving picture, it is necessary to reproduce only from, the sampling points of one field being transmitted at the present. Accordingly, as a matter of course, the transmission signal band of the moving picture portion becomes narrow, and blurring becomes obvious, and as its countermeasure, when moving the entire picture parallel such as panning, the motion vector is transmitted, and the sampling point position in interpolation between frames is corrected at the receiving side so as to interpolate accurately. In this method, in the case of parallel moving of the entire picture such as panning, in spite of the moving picture, a high resolution similar to that of a still picture can be obtained.

As clear from the description herein, this technique is a band compression method of high definition television signals suited to both still pictures and moving pictures, but various control signals such as correction position information of sampling points relating to still pictures and moving pictures are transmitted once in one field as being superposed as digital signals within the vertical blanking period, and, at the receiving side, the sampling point positions are corrected by controlling the writing and reading addresses of the frame memory according to these control signals.

The signal form in the state of the baseband according to this method is explained by reference to FIG. 2, in which numerals 11 and 12 are horizontal synchronizing signals, 11 being rising and 12 being falling, inverting in every one horizontal scanning period (expressed 1H hereinafter). Numeral 13 represents a brightness signal period which was originally a brightness signal of 20 MHz bandwidth and compressed in bandwidth to 8 MHz by sub-Nyquist sampling, and 14 is a color difference signal period which had originally two color difference signals called R-Y, B-Y as line sequential signals and was subjected to sub-Nyquist sampling to a frequency band of 8 MHz with the time axis compressed to $\frac{1}{4}$.

The vertical synchronizing signal portion is explained with reference to FIGS. 3A–3B. FIGS. 3A–3B respectively shows the portion of 2H of the first line and second line of the scanning lines composing one screen of 1125 lines. Numeral 15 denotes a pulse train repeated 17.5 times in 4 transmission clock widths, and 16 is a flat period of 16 transmission clock widths; after this the level is inverted and there is a flat period 17 of 18 transmission clockwidths. The signals indicated by 15 to 17 are presented as being inverted on the first line and second line. Numeral 18 is a horizontal synchronizing signal, and it was originally inverted between rising and falling in every 1H, but since the signal is reset on the second line, the same falling signals continue as shown in the diagram. The changeover point 19 of 16 and 17 on the second line is the frame pulse point, which corresponds to the conventional vertical synchronizing signal. In this example, however, unlike the conventional vertical synchronizing signal, it exists only once in one frame.

After band compression, synchronizing signals as explained above are added to the MUSE signals, which are actually emphasized or dispersed for energy dispersion before frequency modulation, and are transmitted through a broadcasting satellite.

On the other hand, by this method, since the high definition television signals are compressed in bandwidth from over 20 MHz to about 8 MHz, it is useful not only for satellite broadcasting, but also for recording and reproducing, and it is expected to be applied to VCR's, and videodiscs, etc.

As for the videodisc, in particular, since the high definition, wide and dynamic pictures can be readily enjoyed at home, an early commercialization is expected. The greatest difference of this MUSE system videodisc from the existing television system is that the synchronizing signals cannot be easily separated in amplitude because of positive pole synchronization as shown in FIGS. 2 and 3A–3B, and therefore it is very difficult, if not impossible, to use the synchronizing signals by separating them in the control of rotation of the disc, etc. It is accordingly proposed to record pilot carrier signals which have a single continuous frequency synchronized with the video signals on a disc by frequency-multiplexing on frequency-modulated MUSE signals, and detect these pilot carrier signals when reproducing to use them in the control of disc.

As explained hereabove, since the MUSE signal is composed of sub-Nyquist sampling, if there is jitter in the reproduced signal, a deviation occurs in the sample phase, and it may be impossible to decode into the original signal, and hence it is necessary to shift the time axis or correct the jitter. In the prior art, the jitter was mechanically corrected by detecting the pilot carrier signals and directly driving the reproduction pickup of the disc, or shifting the mirror fixed to the galvanometer.

Thus, in the MUSE system videodisc, correction of jitter is important, but in order to spread widely in the consumer product market, a smaller size and a lower price of the machines are essential, and there is a limit in the mechanical jitter correction method. Accordingly, an electrical method may be considered, and from the viewpoint of quality of reproduced signals, a digital time base collector (TBC) using a digital memory is normally used. Since the television signal of the MUSE system possesses a bandwidth of 8 MHz or more, in order to convert some into a digital signal without sacrificing the reproduction bandwidth, it is generally necessary to convert the signal from an analog signal to a digital signal (A/D conversion) at a sampling clock of 24 MHz or more. The frequency of this level is, however, near the limit of ordinary TTL logic IC's, and a particularly high speed TTL IC is needed. But high speed TTL IC's have a high in power consumption, or when parallel processing is done in order to use low speed IC's, it gives rise to an increase in the number of circuit elements, which was a great barrier for realizing low cost LSI's for consumer use.

SUMMARY OF THE INVENTION

It is hence a primary object of this invention to present a videodisc reproducing apparatus possessing a TBC operated by a low speed sampling clock in order to solve the above problems.

To achieve the above object, the videodisc reproducing apparatus of this invention comprises a pilot carrier extraction circuit for picking up a pilot carrier from the disc reproduced signal recording television signals of the MUSE system, a clock generating circuit for generating a sampling clock synchronized with the pilot carrier, a phase detecting circuit for detecting the sampling phase of the disc reproduced signal digitally converted by the sampling clock, a phase shifting circuit for varying the phase of the sampling clock fed to an A/D converter from the output of the phase detecting circuit, and a memory circuit for changing the time axis of the reproduced signal, that is, correcting the jitter, by writing at the clock of the output of the phase shifting circuit, and reading at a reference clock.

While the novel features of the present invention are set forth in the appended claims, the invention, both as to organization and content, will be better understood and appreciated, along with other objects and features thereof, from the following detailed description taken in conjunction with the drawings.

DETAILED DESCRIPTION OF THE INVENTION

A practical example of the composition of the present invention and an embodiment are described below while referring to FIG. 4.

Figure 1:
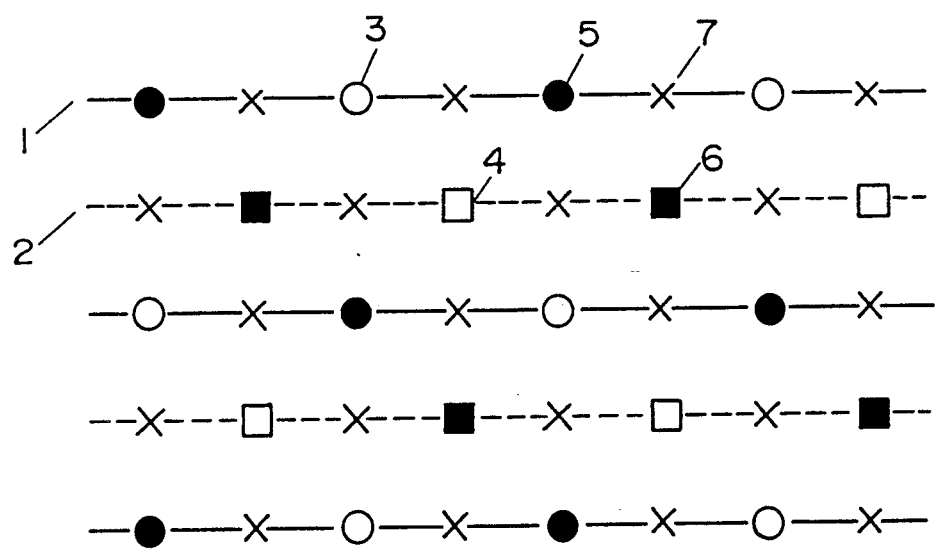
FIG. 1 is a drawing for explaining the sub-sampling pattern in a MUSE signal.
Figure 2:
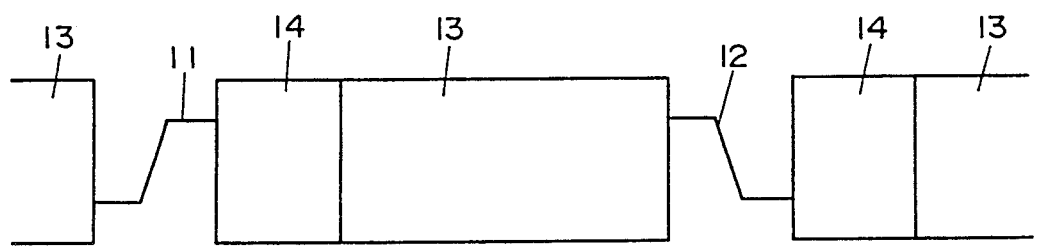
FIG. 2 is a waveform diagram showing the signal format of a MUSE signal.
Figure 3A:
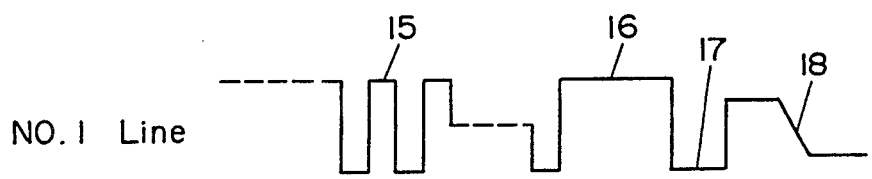
FIGS. 3A-3B are waveform diagrams showing the signal format of frame pulse portion of a MUSE signal.
Figure 3B:
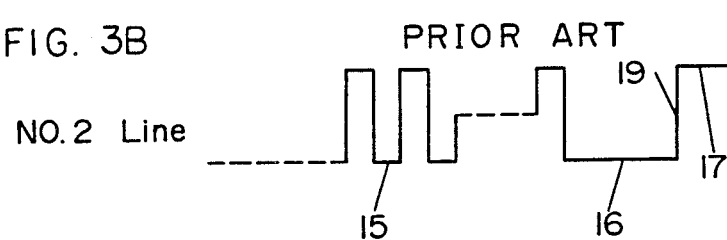
Figure 4:
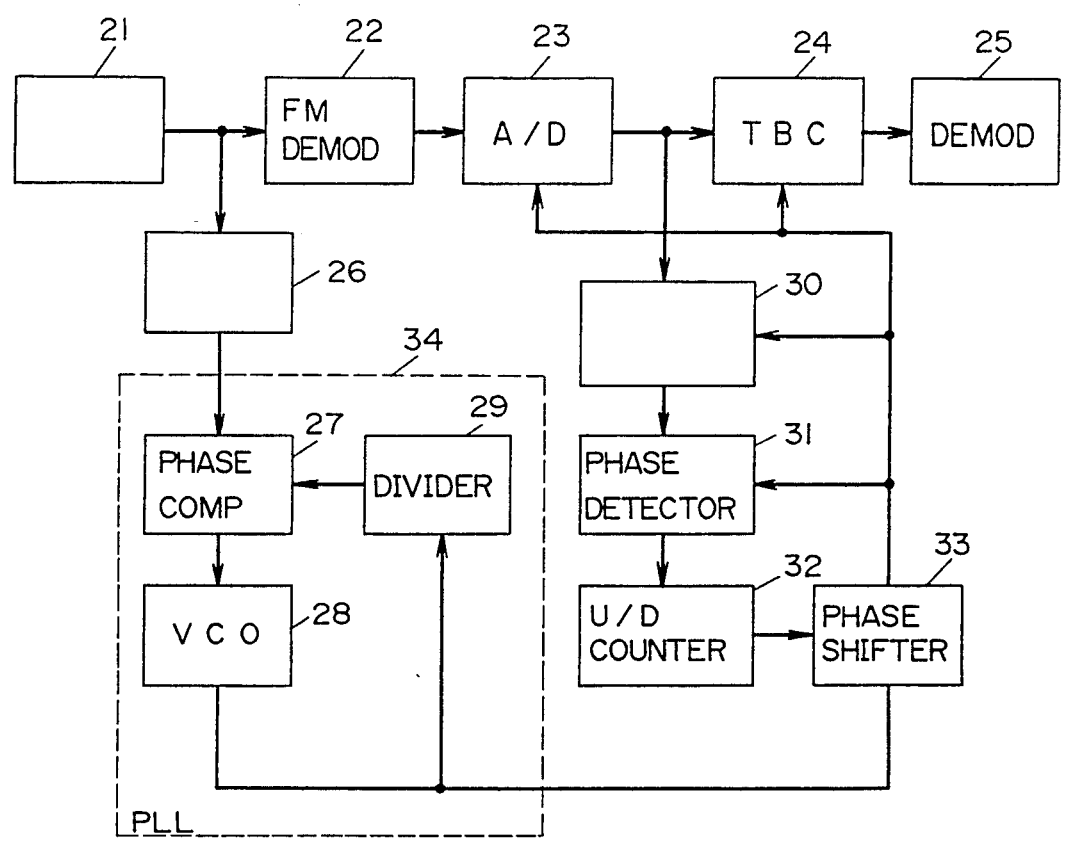
FIG. 4 is a block diagram of a videodisc reproducing apparatus in accordance with one of the embodiments of the present invention.

In FIG. 4, numeral 21 denotes a disc reproducing device for reproducing FM signals or the like by means of a pickup from a disc in which video signals are recorded; numeral 22 denotes a frequency demodulator for demodulating the reproduced FM signals into original video signals; numeral 23 denotes an A/D converter circuit for converting the demodulated analog video signals into digital signals; numeral 24 denotes a digital time base collector (TBC) for writing the video signals having jitter into a memory by a clock synchronized therewith, and reading out by another stable reference clock (not shown) to obtain a jitter-free television-signal, and numeral 25 denotes a demodulator for demodulating the jitter-corrected television signal, that is, a MUSE signal into an original high definition signal of a wide bandwidth.

Furthermore, numeral 26 is a pilot carrier extraction circuit for picking up a pilot carrier from the FM signal reproduced from the disc; numeral 27 denotes a phase comparator circuit for compare the phase between the pilot carrier and the output signal from a frequency dividing circuit 29 mentioned later; numeral 28 denotes a voltage controlled oscillator circuit (VCO) which is controlled by the output of the phase comparator circuit, and numeral 29 denotes the frequently dividing circuit for generating the same frequency as the pilot carrier by dividing down the clock signal which is the output of the VCO 28; the portion 34 enclosed by broken lines consisting of circuits 27, 28, 29 composes a phase locked loop (PLL) circuit for generating a clock synchronized with the pilot carrier.

Numeral 30 denotes a synchronizing signal detecting circuit for detecting a frame pulse which is a vertical synchronizing signal and a horizontal synchronizing signal from digitally converted MUSE signals; numeral 31 denotes a phase detecting circuit for detecting whether the re-sampling phase of the A/D converter circuit is advanced or retarded from the normal position from the detected synchronizing signal; numeral 32 denotes an up/down counter for counting up or down depending on the output signal of the phase detecting circuit 31 and for feeding a value for changing over the clock phase as an address signal to the next stage, and numeral 33 denotes a clock phase shifting circuit for selecting a clock of the corresponding phase from the plural clock phase signals according to the input address signal, and for feeding some as the re-sampling clock of the A/D converter circuit 23.

The clock perfectly matched in the time axis variation with the input video signal having jitter is obtained by the PLL circuit 34, but as explained in relation to the prior art, since the clock phase cannot be matched in this state, the optimum phase is obtained in the phase shifting circuit of clock indicated by numeral 33.

Generally, the phase with respect to the video signal of the pilot carrier is determined at the time of recording on the disc, and it does not change while reproducing one disc. Therefore, it does not matter if the control response of the re-sampling phase is late as in this example. Besides, since the re-sampling phase of the horizontal synchronizing signal is detected only once in one horizontal scanning period, the higher speed is meaningless. Therefore, as the clock of the up/down counter, the horizontal synchronous pulse or its divided pulse may be appropriate.

Figure 5:
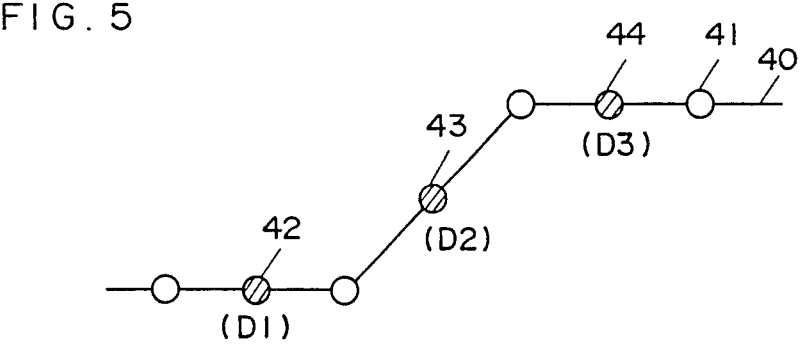
FIG. 5 is a waveform diagram for explaining the horizontal synchronizing signal of a MUSE signal and re-sampling position, in order to illustrate the operating principle of the phase detecting circuit of the embodiment of FIG. 4.

FIG. 5 shows the principle of detecting the phase of re-sampling from the horizontal synchronizing signal. In this diagram, numeral 40 denotes a horizontal synchronizing signal waveform, whose polarity is actually inverted in every scanning line. Numerals 41 to 44 are marks showing the normal re-sampling positions, whose values of 42, 43, 44 are used in actual calculations. Supposing each value to be D1, D2, D3 as shown in the diagram, depending on whether the value calculated in the formula $$(D1+D3)\div 2 - D2$$

is positive or negative, a determination is made as to whether the re-sampling position is advanced or retarded from the normal position, and furthermore by the magnitude of the value, the amount of deviation can be calculated. Actually, as explained above, since the polarity of the signal is inverted in every scanning line, it is necessary to invert the data accordingly.

Figure 6:
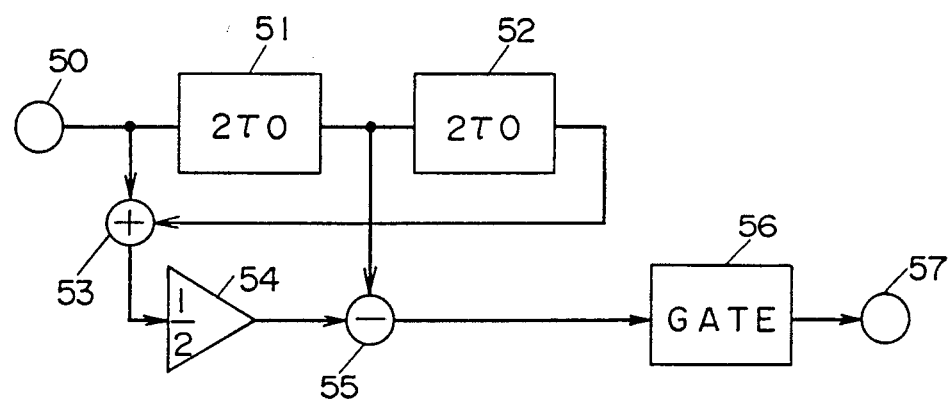
FIG. 6 is a block diagram of the phase detecting circuit of a videodisc reproducing apparatus of the same embodiment.

Referring now to FIG. 6, a block diagram of a practical circuit of the phase detecting circuit (element 31 in FIG. 4) for performing the above calculation is explained. Incidentally, the details of this phase detection and phase synchronization are mentioned, for example, in the Japanese Laid-open Patent Sho. 59-221091 (Close phase locking method). In this diagram, numeral 50 denotes a digital video signal input terminal; numerals 51 and 52 denote adder delay elements having a delay time of $2\tau_0$ when assuming that the time of one period of clock to be $\tau_0$; numeral 53 denotes an adder which sums up the data of $0\tau_0$ and $4\tau_0$; numeral 54 denotes a divider for dividing the data of the adder by $\frac{1}{2}$; numeral 55 denotes a subtractor for subtracting the data of $2\tau_0$ from the $\frac{1}{2}$; numeral 56 denotes a gate circuit for extracting only the data of the horizontal synchronizing signal portion from the result of the calculation, numeral 57 denotes and an output terminal for outputting the result of the calculation.

In this way, the re-sampling phase can be detected, but in this invention it is only enough to detect the advancing or retarding, and up to the calculation denoted by 55 in FIG. 6, a sufficient number of bits, for example, 7 or 8 bits may be necessary, but thereafter only binary values or 1-bit data may be enough. Practically it may be designed so as to feed only the highest bit after calculation to the next stage.

Figure 7:
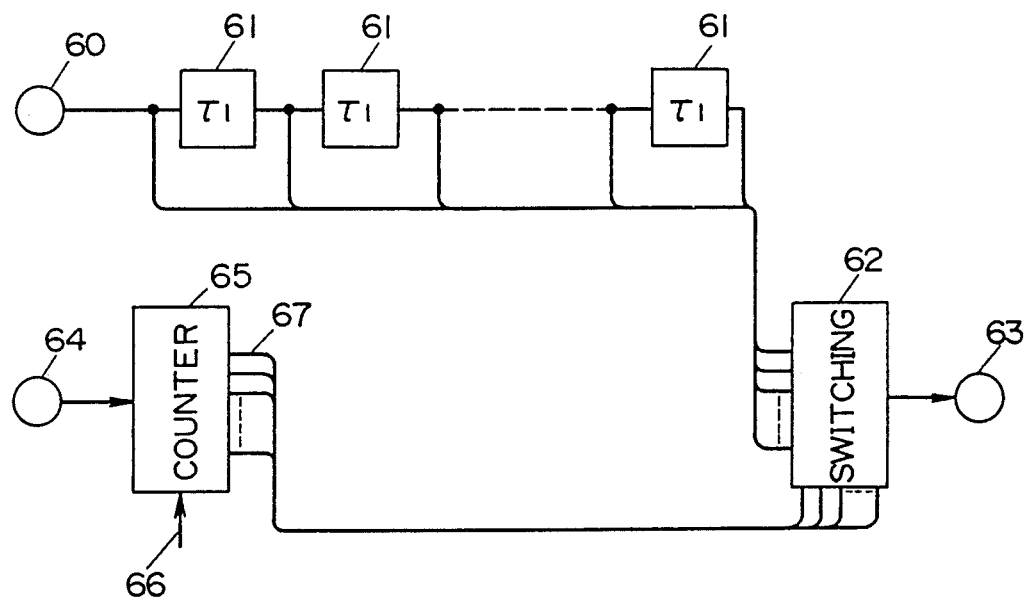
FIG. 7 is a block diagram of an up-down counter and clock phase shifting circuit.

A practical organization of the up/down counter and clock phase shifting circuit (elements 32 and 33 in FIG. 4) is explained by referring to FIG. 7. In this diagram, numeral 60 denotes a clock signal input terminal for receiving a signal from the PLL circuit (element 34 in FIG. 4); numeral 61 denotes show small delay elements (delay time $\tau_1$), which are connected in series by the necessary number of stages for obtaining plural clock phases. The relationship between this delay time ($\tau_1$) and the number of stages is as follows: in the case of a MUSE signal, since the frequency of the sampling clock is 16.2 MHz, supposing the precision of the phase to be controlled to be 2 nsec or more, $\tau_1$ is 1.92 nsec, and all of the phases are obtained in 32 stages. Numeral 62 denotes a switching circuit, and clocks of all phases are fed from all connecting points of delay elements 61 connected in series, and a corresponding one is selected from the phases depending on the address signal supplied to other control terminal, and is delivered as a re-sampling clock and is supplied to the next stage from the terminal 63. In this example explained above, since there are 32 stages, the control signal has 5 bits, and a proper phase is selected from 32 different phases. Numeral 64 denotes a signal input terminal of 1 bit of delay or advance supplied from the phase detecting circuit, and numeral 65 denotes a 32-stage counter for counting up or down according to the delay or advance signal (1 or 0). Numeral 66 denotes an input of a clock for operating the counter, and in this example, a horizontal synchronizing pulse or its divided pulse is used. Numeral 67 denotes a counter output, which is added to the control signal input of the switching circuit 62 as an address signal of 32 stages, that is, 5 bits.

Figure 8A:
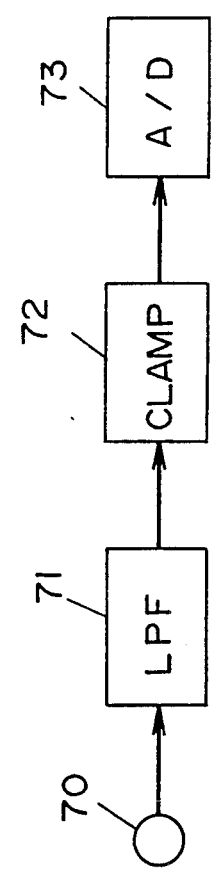
FIGS. 8A-8B are drawings showing practical compositions of analog interfaces for supporting the theory of superior effectiveness of the digital interface, FIG. 8A being a block diagram of an input A/D converter and FIG. 8B being a block diagram of an output D/A converter.
Figure 8B:
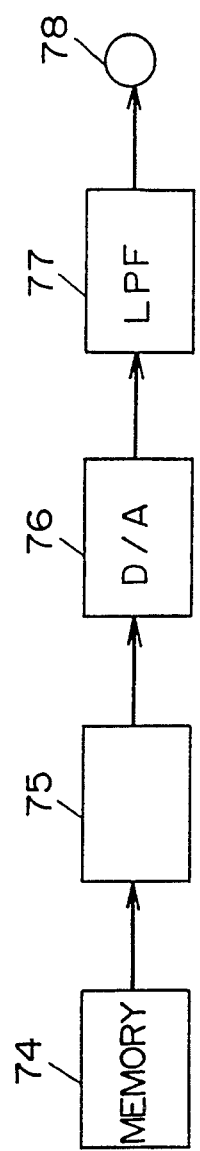

FIGS. 8A and 8B are explanatory diagrams of analog interfaces. Specifically, FIG. 8A further describes the constitution of an A/D converter denoted by numeral 23 in FIG. 4; numeral 70 denotes a MUSE signal input terminal; numeral 71 denotes a low pass filter; (LPF) numeral 72 denotes a clamp circuit, and numeral 73 denotes the main body of an A/D converter. In this diagram, the characteristic of the LPF 71 is particularly important, and in order to avoid ringing in re-sampling, the frequency chracteristic of amplitude and group delay must be strictly matched with the output stage LPF at the encoder side of the MUSE system. FIG. 8B is an explanatory diagram of the output portion of the disc reproducing device for interfacing with the decoder in the analog state, in which element 74 is same as the TBC circuit 24 in FIG. 4; numeral 75 denotes a double clock interpolating circuit for converting the signal of a 16 MHz clock into a signal of a 32 MHz clock; numeral 76 denotes the main body of a D/A converter; numeral 77 denotes an output LPF, and numeral 78 denotes an analog signal output terminal. As explained in FIG. 8A, since the frequency characteristic is strictly defined, in order to minimize the effects of the disturbance of the characteristic near the cut-off point of the LPF in the output stage, the digital signal in the state of 16.2 MHz is doubled, and the cut-off frequency of the output LPF is set higher, and the deterioration of characteristic near 8 MHz is designed to be decreased. In this circuit, however, when this analog signal is supplied into the decoder, it passes through the circuit having the same structure as shown in FIG. 8A again when being converted into a digital signal, and it means it passes through the same filter as LPF 71 twice, and the effect of the filter characteristic is doubled, and the characteristic deterioration of signal occurs, which may possibly lead to occurrence of ringing or other troubles. Therefore, if a D/A conversion of a complicated structure as in FIG. 8A is effected at the output stage of disc reproducing device, for example, the deterioration of the signal due to analog interface is sure to occur, more or less.

Accordingly, the disc reproduced signal converted into digital signal in the method shown in this embodiment has been already re-sampled at 16.2 MHz which is usually effected at the entrance of the MUSE system decoder, and hence it is not necessary to re-sample once more. Therefore, when the disc reproduced signal in the state of digital signal is directly connected to the digital circuit of the decoder, the deterioration of the signal due to repeated passing through a D/A and an A/D converter may be minimized. In this case, it is necessary to synchronize between the digital clock at the disc reproducing device side and the digital clock at the decoder side, and it can be easily realized by supplying the reference clock of 16.2 MHz from the decoder side. On the contrary, it is also possible to synchronize at the decoder side by feeding the reference clock at the disc reproducing device side to the decoder together with the digital television signal.

According to this embodiment, the jitter correction necessary when reproducing the disc recording MUSE system television signals can be effected by a clock of the lowest limit speed in digital state, and therefore it is possible to compose a system using TTL IC's of the low power consumption type and only a small capacity is enough for the memory circuit. Moreover, it is effective for LSI design.

Still more, when connecting to a decoder, since digital interface can be easily achieved, the number of passes through D/A and A/D converters is reduced by one, so that excellent reproduced image quality may be obtained. Hence, a very useful disc reproducing apparatus may be presented.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

We claim:
1. A videodisc reproducing apparatus comprising:
a pilot carrier extraction circuit for extracting a pilot carrier from a videodisc reproduced signal;
a clock generating circuit comprising an analog/digital converter and a phase-locked loop oscillator for generating a sampling clock signal for said analog/digital converter by which said videodisc reproduced signal is converted into digital form in synchronism with said pilot carrier;
a phase-shift circuit for phase shifting said sampling clock signal for providing a plurality of phases of said sampling clock signal, and for applying a thus phase shifted sampling clock signal to said analog/digital converter, said phase shift circuit comprising a combination of a plurality of fine phase-delay circuits;
a synchronizing signal detection circuit for detecting a synchronizing signal included in a MUSE signal of said videodisc reproduced signal converted into digital form by said analog/digital converter;
a phase detecting circuit for detecting a digital sampling phase of said synchronization signal included in said MUSE signal of said videodisc reproduced signal converted into a digital form by said analog/digital converter according to positional information in said synchronizing signal detected by said synchronizing signal detection circuit, and for detecting whether a thus detected digital sampling phase is advanced or retarded with respect to a digital sampling phase of a specified normal MUSE signal; and
an address generating circuit for generating an address signal output, said address generating circuit comprising an up/down counter controlled by an output of said phase detecting circuit, wherein an optimum sampling phase of said sampling clock signal is constantly attained by controlling said phase-shift circuit according to said address signal output from said address generating circuit.

* * * * *